| United States Patent [19] | [11] 3,763,008 |
| Nakayama et al. | [45] Oct. 2, 1973 |

[54] PROCESS FOR PRODUCING RIBOSIDES OF HETEROCYCLIC ORGANIC BASES BY FERMENTATION

[75] Inventors: Kiyoshi Nakayama, Sagamihara; Akira Furuya, Kawasaki; Fumio Kato, Fukuoka, all of Japan

[73] Assignee: Kyowa Hakko Kogyo Co., Ltd., Tokyo, Japan

[22] Filed: Feb. 25, 1972

[21] Appl. No.: 229,580

[30] Foreign Application Priority Data
Feb. 26, 1971 Japan.................................. 46/9298
Apr. 14, 1971 Japan................................ 46/23041
Apr. 14, 1971 Japan................................ 46/23042

[52] U.S. Cl............................................... 195/28 N
[51] Int. Cl............................................... C12d 13/06
[58] Field of Search.................................. 195/28 N

[56] References Cited
UNITED STATES PATENTS

| 3,269,917 | 8/1966 | Imada et al. | 195/28 N |
| 3,296,089 | 1/1967 | Nakayama et al. | 195/28 N |
| 3,308,036 | 3/1967 | Nakayama et al. | 195/28 N |
| 3,586,606 | 6/1971 | Nakayama et al. | 195/28 N |
| 3,366,550 | 1/1968 | Nakayama et al. | 195/28 N |
| 3,562,111 | 2/1971 | Nakayama et al. | 195/28 N |

*Primary Examiner*—Alvin E. Tanenholtz
*Attorney*—Joseph M. Fitzpatrick et al.

[57] ABSTRACT

Ribosides of heterocyclic organic bases are produced by fermentation of an aqueous nutrient medium, containing a heterocyclic organic base, by a microorganism belonging to the genus Brevibacterium, Arthrobacter, Corynebacterium, or Micrococcus. The riboside is accumulated and thereafter recovered from the culture liquor.

7 Claims, No Drawings

PROCESS FOR PRODUCING RIBOSIDES OF HETEROCYCLIC ORGANIC BASES BY FERMENTATION

BACKGROUND OF THE INVENTION

The present invention relates to a process for producing ribosides of heterocyclic organic bases by fermentation; and is more specifically directed to the production of ribosides of 6-azauracil, pyrimidine analogues and purine analogues on an industrial scale at a low cost by fermentation using a bacterium.

The products of the present invention are useful medicinal agents. For example, 6-azauracil riboside is recognized as being an anti-cancer agent. Ribosides of pyrimidine analogues are also useful anti-cancer agents as well as being anti-virus agents and useful agricultural chemicals. Similarly, ribosides of purine analogues are recognized as being anti-cancer and anti-viral agents as well as useful agricultural chemicals. Moreover, the latter are also useful as immunity-depressors and anti-arthritics.

Although it has been known to convert heterocyclic bases such as by the process of U. S. Pat. No. 3,535,207, the end results of such prior processes are considered deficient in terms of the quantity of end product accumulated. In view of the considerable importance of these end products, an industrial process is desired which produces the end product in such quantities to make the process economically feasible. To this end the present inventors have provided a process for producing ribosides of heterocyclic organic bases in improved yields by fermentation.

SUMMARY OF THE INVENTION

In accordance with the present invention, an industrially inexpensive process for producing ribosides of heterocyclic organic bases by fermentation is provided wherein the base specific to the desired riboside is added to the culture medium at any stage of culturing and same is converted into the riboside at an extremely high ratio. Thus, the riboside of the heterocyclic organic base is formed and accumulated in the culture liquor in a high concentration and may be readily recovered therefrom. The process is further characterized in that not only carbohydrates but also cheaper hydrocarbons such as n-paraffin, etc. and organic acids can be utilized as a carbon source in the culture medium.

In accordance with the present invention, a heterocyclic organic base is converted into the corresponding riboside. The heterocyclic organic bases contemplated by the invention are 6-azauracil, purine analogues and pyrimidine analogues. The purine analogues and pyrimidine analogues contemplated by the invention are characterized by the following general formulas respectively:

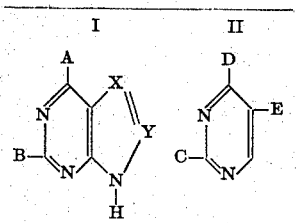

In the above formula I, A and B represent a member selected from the group consisting of a hydrogen atom, hydroxyl group, amino group, alkylamino group, dialkylamino group, benzyl-amino group, hydroxyamino group, mercapto group, alkylmercapto group, halogen atom and alkyl, alkoxy, amide or benzyl group; and X and Y represent a member selected from the group consisting of a nitrogen atom or methine group. In the above general formula II, C and D represent a member selected from the group consisting of a halogen atom, hydroxyl group, mercapto group, alkyl group and amino group; and E represents a member selected from the group consisting of a hydrogen or halogen atom, hydroxyl group, amino group, alkyl group and trihalomethyl group.

Exemplary of the purine analogues, the following compounds are appropriate: 8-azaadenine, 8-azaguanine, 6-mercaptoguanine, 2,6-diaminopurine, 4-hydroxypyrazolo (3,4-d) pyrimidine, 4-aminopyrazolo (3,4-d) pyrimidine, 6-chloroguanine, 6-mercaptoxanthine, 8-azaxanthine, 2-methylhypoxanthine, 6-mercaptopurine, 6. -hydroxyaminopurine, 6-methylpurine, 6-methylaminopurine, 2-methyladenine, 6-methylmercaptopurine, 2-fluoroadenine, 6-chloropurine, 6-methoxypurine, 6-ethoxypurine, 6-methoxy-2-chloropurine, 2-chlorohypoxanthine, 2-methylhypoxanthine, 2-ethylhypoxanthine, 2-mercaptohypoxanthine, $N^2$-methylguanine, $N^2,N^2$-dimethylguanine, $N^2$-acetylguanine, $N^6$-acetyladenine, $N^6$-benzyladenine, 2-hydroxy-$N^6,N^6$-dimethyladenine, 8-azahypoxanthine, 6-mercaptoguanine, and 2-methoxypurine.

Exemplary of the pyrimidine analogues, the following compounds are appropriate: 6-azauracil, 5-aminouracil, 5-methylcytosine, 5-fluorouracil, 5-chlorouracil, 5-bromouracil, 5-iodouracil, 5-hydroxyuracil, 2-thiouracil, 4-thiouracil, dithiothymine, 5-fluorocytosine, 5-chlorocytosine, 5-hydroxycytosine, 2-thiothymine, 4-thiothymine, and 2-thiocytosine.

The corresponding ribosides of the heterocyclic organic bases are generally characterized by the following general formulas:

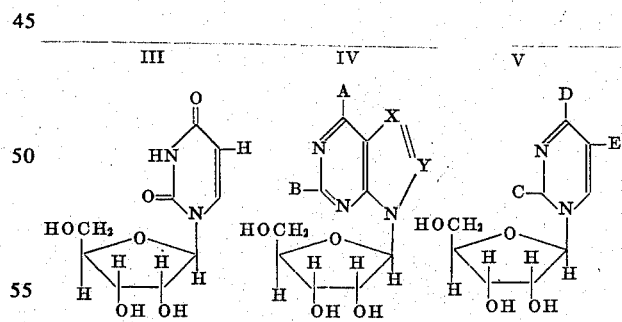

In the above formulas IV and V the same reference letters, denote the same groups as set forth for formulas I and II.

The organisms found useful in the present invention belong to the genera Brevibacterium, Corynebacterium, Arthrobacter and Micrococcus; all of which are found within the class Schizomycetes. Brevibacterium is a genus within the family Brevibacteriaceae, order Eubacteriales and is generally characterized by: short, unbranching rods; generally non-motile; type of motility of motile species peritrichous or uncertain; sometimes chromogenic, with non-water-soluble reddish, reddish orange, yellow or brown pigments; may or may not reduce nitrates; glucose broth useally becomes acid; lactose not fermented; proteolytic action varies with the species; aerobic and facultatively anaerobic; rarely microaerophilic. Corynebacterium is a genus within the family Corynebacteriaceae, order Eubacteriales, and is generally characterized by: straight to slightly curved rods with irregularly stained segments, sometimes granules; frequently show club-shaped swellings, snapping division produces angular and palisade (picket fence) arrangements of cells; non-motile with exceptions among the plant pathogens; Gram-positive, sometimes young cells and sometimes old cells losing the strain easily; granules invariably Grampositive; generally quite aerobic, but microaerophilic or even anaerobic species occur; catalase-positive; may or may not liquefy gelatin; may or may not produce nitrites from nitrates; may or may not ferment sugars, but seldom, if ever, is a high acidity produced; many species oxidize glucose completely to $CO_2$ and $H_2O$ without producing visible gas. Arthrobacter is a genus within the family Corynebacteriaceae, order Eubacteriales, and is generally characterized by: in young cultures the cells appear as rods which may vary in size and shape from straight to bent, curved, swollen or club-shaped forms; snapping division may show angular cell arrangement; short filament formation with rudimentary budding may occur, especially in richer liquid media; Gram-negative or Gram-variable, coccoid cells are characteristically observed in cultures after one or more days, these coccoid cells persist as the predominant form in older cultures and are Gram-negative to Gram-positive; larger coccoid cells (cystites) which give rise to one or more rod-shaped cells on fresh transfer, also occur; generally non-motile; growth on solid media soft or viscous; growth in liquid media generally not profuse; most species liquefy gelatin; little or no acid from carbohydrates; nitrites generally produced from nitrates; indole not produced; aerobic; most species show little or no growth at 37°C. Micrococcus is a genus within the family Micrococcaceae, order Eubacteriales and is characterized by: cells in irregular masses (never in packets); the group is regarded as Gram-positive although some species lose their power to retain the Gram stain so quickly that they are frequently reported as Gram-negative; some species are motile or show motile varieties; growth on agar usually abundant; some species form no pigment but others form yellow, orange or red pigment; catalase-positive so far as known; glucose broth slightly acid, lactose broth generally neutral; gelatin frequently liquefied, but never rapidly; saprophytic, facultatively parasitic or parasitic.

Of the aforementioned microorganisms, it is to be recognized that mutant strains thereof are appropriate for purposes of the present invention, and such mutant strains may be produced by any well known means such as by X-ray irradiation. Among the microorganisms suitable for the present invention, the following bacteria are considered to be preferred: *Brevibacterium ammoniagenes*, FERM-P No. 813 (ATCC 21477) Arthrobacter sp. No. 3489, FERM-P No. 811 (ATCC 21647) Corynebacterium sp. No. 3546, FERM-P No. 812 (ATCC 21648) *Micrococcus sodonensis* (ATCC 19212).

The microbial properties of the above unnamed species are as follows:

Arthrobacter Sp. No. 3489 (ATCC 21647)
A. Morphological Properties:
Cell form: Short rods. Occurring singly or in V-shaped pairs as a result of snapping division. Branching and elongation may occur in a citrate medium.
Size: 0.3 – 0.4 by 1.0 – 1.5 $\mu$
Motility: Non-motile.
Gram's staining: Positive or variable
B. Culturing Properties:
Gelatin stab: Liquefaction, crateriform.
Agar colonies: Circular, 2 – 4 mm in diameter, smooth, flat, entire, glistening, amorphous, creamy-orange, opaque.
Agar slant: Abundant growth, filiform, raised, glistening, smooth, opaque, creamy-orange.
Agar stab: Growth filiform or beaded, best growth at top.
Broth: Moderate growth. No growth at surface, flocculent sediment. No gas produced.
Potato: No growth.
Litmus milk: Reduction at bottom.
Tellurite medium: Poor colony, gray or black.
C. Physiological Properties:
B.C.P. milk: Slightly alkaline.
Indole: Not produced.
Hydrogen sulfide: Produced in cysteine medium.
Sugar media: Acid from fructose but no gas.
Acetylmethylcarbinol: Not produced.
Starch: Not hydrolyzed.
Nitrites: Produced from nitrates.
Urease: Slightly positive.
Catalase: Positive.
Cellulose: Not hydrolyzed.
Biotin required for growth.
D. Growth Conditions:
Aerobic.
Temperature: Optimum at 32°C, no growth at 41°C.
Corynebacterium sp. No. 3546 (ATCC 21648):
A. Morphological Properties:
Cell form: Short rods. Sometimes branching occurs. Elongated in 10 percent citrate medium.
Size: 0.3 – 0.6 by 0.6 – 1.5 $\mu$
Motility: Non-motile.
Gram's staining: Positive or variable.
B. Culturing Properties:
Gelatin stab: Liquefaction.
Agar colonies: Circular, 4 to 10 mm in diameter, smooth, convex, entire, amorphous, white, opaque, glistening.
Agar slant: Moderate growth, filiform, flat, glistening, smooth opaque, creamy white, butyrous.
Agar stab: Filiform to beaded, best growth at top.
Broth: No growth at surface, moderate growth, compact sediment, no gas produced.
Potato: No growth.
Litmus milk: Slightly alkaline.
Tellrite medium: Poor growth.
C. Physiological Properties:
B.C.P. milk: Slightly alkaline.
Indole: Not produced.
Hydrogen sulfide: Produced in cysteine medium.

Sugar media: Acid but no gas from glucose, sucrose, raffinose, fructose, mannitol, xylose, maltose, dextrin, inulin and melibiose.
Acetylmethylcarbinol: Not produced.
Starch: Not hydrolyzed.
Nitrite: Not produced from nitrate.
Urease: Positive.
Catalase: Positive.
Cellulose: Not hydrolyzed.
Biotin required for growth.
D. Growth Conditions:
Aerobic.
Temperature: Optimum at 30°C, no growth at 41°C.

Either a synthetic or natural culture medium may be used in the present invention, so long as it contains appropriate amounts of a carbon source, for example, carbohydrates such as saccharine materials, etc, hydrocarbons and the like; an organic or inorganic nitrogen compound; an inorganic salt and, if necessary, additional nutrients. Any kinds of carbon sources and nitrogen sources can be used so long as they can be utilized by the strains employed. That is to say, as a carbon source, various carbohydrates such as glucose, fructose, sucrose, maltose, mannitol, galactose, ribose, starch, starch hydrolyzate solution, molasses, etc.; various organic acids such as gluconic acid, pyruvic acid, lactic acid, acetic acid, etc.; alchols such as glycerol, etc.; hydrocarbons such as normal paraffins, kerosene, etc.; and amino acids such as glycine, glutamic acid, alanine, glutamine and asparagine, are appropriate. As a nitrogen source, there can preferably be used ammonia; various inorganic and organic ammonium salts such as ammonium chloride, ammonium phosphate, ammonium sulfate, ammonium nitrate, ammonium carbonate, ammonium acetate, etc; urea; nitrogeneous organic substances such as peptone, NZ-amine, meat extract, yeast extract, corn steep liquor, casein hydrolyzate, fish meal or its digested product, and the like; and others such as glycine, glutamic acid, alanine, etc. Further, potassium dihydrogen phosphate, dipotassium monohydrogen phosphate, magnesium sulfate, calcium carbonate, etc. are preferable as an inorganic substance. When a microorganism, which further requires additional nutrients is used, a material which satisfies the requirement, must be added to the culture medium as a matter of course.

The invention is characterized in that the heterocyclic organic base which is specific to the desired riboside end product, is added to the culture medium which is fermented by a microorganism belonging to the genus Brevibacterium, Corynebacterium, Arthrobacter or Micrococcus and which is capable of converting the base to the corresponding riboside, and the same is accumulated in the culture medium and is thereafter recovered. In determining whether a specific microorganism is capable of converting a specific heterocyclic organic base to the corresponding riboside, any standard screening test may be used. For example, a candidate microorganism is cultured in a medium containing 6-azauracil and thereafter, a test is conducted to determine whether the riboside is formed in the culture liquor.

The specific heterocyclic organic base may be added to the medium before or during the course of fermentation. The base may be added all at one time; intermittently or continuously during the fermentation period. The base may be employed in various concentrations in the fermentation medium and a concentration ranging from 1 g/l to 20 g/l is preferred. In addition, it is possible to add the base to the culture medium in the form of a suitable salt such as a sulfate or hydrochloride.

Fermentation is carried out under aerobic conditions by shaking culture; aeration-stirring, submerged culture; or the like. Culturing temperature is preferably 20°C. to 40°C. and the pH of the medium is adjusted to a pH of 4 to 10 (preferably around the neutrality) with aqueous ammonia, urea solution, caustic soda solution or the like during the course of culturing. These temperature and pH conditions are not essential for carrying out the present invention and may vary according to the specific microorganism used.

It is preferred that the microorganism be initially grown in a seed medium prior to being used to inoculate the main culture medium. The seed medium is incubated under favorable growth conditions for a period of time sufficient to develop a suitable organism population, typically for about 24 hours. The seed medium is then used to inoculate the main culture medium. Fermentation is thereafter carried out until a considerable amount of the corresponding riboside is formed and accumulated in the resultant culture liquor, usually 2 to 8 days.

After the completion of culturing, the riboside is recovered from the culture liquor by a ion exchange resin treatment. Typical is the treatment as shown in the following Example 1. It is also possible to recover the riboside by any other well known ion exchange resin treatment, or other means such as absorption, precipitation, extraction or the like.

Practice of certain specific embodiments of the present invention is illustrated by the following representative examples.

EXAMPLE 1

In this example, a mutant strain (FERM-P No. 813, ATCC 21477) obtained from *Brevibacterium ammoniagenes* ATCC 6872 by ultra-violet irradiation is used as a seed microorganism, and a seed culture liquor is obtained by culturing the strain in a seed medium comprising 2 percent glucose, 1 percent peptone, 1 percent meat extract, 1 percent yeast extract and 0.3 percent sodium chloride at 30°C for 24 hours.

A fermentation medium, having a composition of 130 g glucose, 10 g potassium dihydrogen phosphate, 10 g dipotassium monohydrogen phosphate, 10 g magnesium sulfate, 0.1 g calcium cloride, 10 mg ferrous sulfate, 1 mg zinc sulfate, 10 mg manganese sulfate, 5 mg vitamin $B_1$, 10 mg calcium pantothenate, 20 mg cystine, 30 μg biotin, 10 g meat extract, 10 g yeast extract, 2 g ammonium sulfate, and 2 g urea (separately sterilized) in one liter is prepared. The medium is adjusted to pH 7.8 and then 3 l thereof is placed in a 5-l jar fermenter, sterilized by heating at 120°C for 30 minutes, and inoculated with 300 ml of the seed culture liquor. Culturing is carried out at 32°C while adjusting the pH to 6.8 with aqueous ammonia. At 24 hour and 48 hour periods from the start of culturing, 6-azauracil is respectively added to the medium in an amount corresponding to 5 g/l. After 4 days from the start of culturing, 6-azauracil riboside is accumulated in the culture liquor at a concentration of 22.4 mg/ml.

One liter of a filtrate obtained by filtering the culture liquor to eliminate cells and precipitates is passed through a column of the Cl-form of Dowex 1×2 (Dow Chemical Co.), and the resin which absorbed 6-azauracil riboside is washed with water, and the elution is carried out with a dilute hydrochloric acid solution. Fractions containing 6-azauracil riboside are collected, concentrated under reduced pressure and cooled, whereby 18.4 g of crude crystals of 6-azauracil riboside is obtained. The crude crystals are then subjected to recrystallization from a mixture of water and ethanol. All data of elementary analysis, determination of base and sugar contents, ultraviolet absorption spectrum, Rf value on paper chromatogram, etc. of the product revealed that the same is 6-azauracil riboside.

EXAMPLE 2

In this example, culturing is carried out in the same manner as in Example 1, except that 5-aminouracil is added to the culture medium in an amount corresponding to 5 g/l after 24 hours from the start of culturing. After 4 days of culturing, 5-aminouridine (5-aminouracil riboside) is accumulated in the culture liquor at a concentration of 7.8 g/l. From one liter of the filtrate, 3.8 g of crude 5-aminouridine crystals are obtained.

EXAMPLE 3

In this example, culturing is carried out in the same manner as in Example 1, except that 6-methylaminopurine is added to the culture medium in a concentration of 5 g/l after 24 hours from the start of culturing. After 4 days of culturing, 6-methylaminopurine riboside is accumulated in the culture liquor at a concentration of 8.5 g/l. One liter of the filtrate yields 4.4 g of crude 6-methylaminopurine riboside crystals.

EXAMPLE 4

In this example, culturing is carried out in the same manner as in Example 1, except that Arthrobacter sp. No. 3489 (FERM-P No. 811) (ATCC 21647) is used as the seed strain and 6-azauracil is twice added to the medium in an amount corresponding to 2.0 g/l after 24 hours and 48 hours of culturing. As a result 5.3 mg/ml of 6-azauracil riboside is accumulated in the culture liquor.

EXAMPLE 5

In this example, culturing is carried out in the same manner as in Example 1, except that Corynebacterium sp. No. 3546 (FERM-P No. 812) (ATCC 21648) is used as the seed strain and 6-azauracil is added to the medium in an amount corresponding to 3.0 g/l after 24 hours from the start of culturing. As a result 4.8 mg/ml of 6-azauracil riboside is accumulated in the culture liquor.

EXAMPLE 6

In this example, culturing is carried out in the same manner as in Example 4, except that *Micrococcus sodonensis* (ATCC 19212) is used as the seed strain and 5% n-paraffins ($C_{11} - C_{14}$) is used in place of glucose in the fermentation medium. As a result 7.3 mg/ml of 6-azauracil riboside is accumulated in the culture liquor.

EXAMPLE 7

In this example, culturing is carried out in the same manner as in Example 1, using *Brevibacterium ammoniagenes* (ATCC 21477), employed in Example 1, as a seed microorganism and the respective purine analogues as shown in Table 1 are added to separate mediums respectively in an amount corresponding to 2 g/l after 24 hours from the start of culturing. The amounts of ribosides of the purine analogues accumulated in the respective media are given in Table 1.

TABLE 1

| Purine analogue | Amount of riboside accumulated (g/l) |
| --- | --- |
| 8-azaadenine | 2.5 |
| 2,6-diaminopurine | 2.9 |
| 4-hydroxypyrazolo(3,4-d)pyrimidine | 3.7 |
| 4-aminopyrazolo(3,4-d)pyrimidine | 3.9 |
| 6-chloroguanine | 3.2 |
| 6-mercaptoxanthine | 2.1 |
| 8-azaxanthine | 3.6 |
| 2-methyladenine | 2.8 |
| 8-azahypoxanthine | 2.9 |
| $N^2$-methylguanine | 3.4 |
| $N^2,N^2$-dimethylguanine | 2.3 |

EXAMPLE 8

In this example, Arthrobacter sp. No. 3489 (FERM-P No. 811) (ATCC 21647) is used as the seed microorganism. A fermentation medium containing 120 g starch hydrolyzate (in terms of glucose), 1 g potassium dihydrogen phosphate, 1 g dipotassium hydrogen phosphate, 0.5 g magnesium sulfate, 10 g corn steep liquor, 5 g yeast extract, and 5 g ammonium chloride in 1 liter is used. The pH is adjusted to 7.2 with aqueous ammonia before sterilization. Culturing is carried out in the same manner as in Example 1 and at periods of 24 hours and 48 hours after the start of culturing, the respective purine and pyrimidine analogues as shown in Table 2 are added to separate mediums in an amount corresponding to 2 g/l. Culturing is carried out for 4 days. The pH is adjusted to 7.2 with aqueous ammonia during the course of culturing. As a result, the amounts of the ribosides of the purine and pyrimidine analogues respectively accumulated are shown in Table 2.

TABLE 2

| Purine analgue | Amount of riboside accumulated (g/l) |
| --- | --- |
| 8-azaguanine | 4.9 |
| 6-mercaptoguanine | 4.3 |
| 2-methylhypoxanthine | 5.1 |
| 6-mercaptopurine | 5.5 |
| 6-methylpurine | 3.1 |
| 6-methylmercaptopurine | 4.3 |
| Dithiothymine | 3.7 |
| 5-fluorocytosine | 4.8 |

EXAMPLE 9

In this example, culturing is carried out in the same manner as in Example 8, using Corynebacterium sp. No. 3546 (FERM-P No. 812) (ATCC 21648) as the seed microorganism. After 24 hours and 48 hours from the start of culturing, the purine analogues as shown in Table 3 are respectively added to separate mediums in amounts corresponding to 2 g/l. Culturing is carried out for 4 days. The amounts of the ribosides of the purine analogues accumulated are also shown in Table 3.

TABLE 3

| Purine analogue | Amount of riboside accumulated (g/l) |
| --- | --- |
| 2-fluoroadenine | 3.3 |
| 2-chloropurine | 4.4 |
| 6-hydroxyaminopurine | 3.1 |
| 6-methylmercaptopurine | 2.6 |

EXAMPLE 10

In this example, culturing is carried out in the same manner as in Example 1, using *Micrococcus sodonensis* (ATCC 19212) as the seed microorganism, except that a medium containing 5% n-paraffin ($C_{11}$ to $C_{14}$) in place of glucose as shown in Example 1 is used as the fermentation medium. After 24 hours from the start of culturing, the purine analogues as shown in Table 4 are respectively added to separate mediums in amounts corresponding to 4 g/l. Culturing is carried out for 3 days. The results are shown in Table 4.

TABLE 4

| Purine analogue | Amount of riboside accumulated (g/l) |
| --- | --- |
| 2-methoxypurine | 4.2 |
| 2-ethylhypoxanthine | 4.7 |
| N⁶-acetyladenine | 4.2 |
| 2-mercaptohypoxanthine | 3.6 |

EXAMPLE 11

In this example, culturing is carried out in the same manner as in Example 8, using *Brevibacterium ammoniagenes* (ATCC 21477) as a seed microorganism. After 24 hours from the start of culturing, the purine analogues as shown in Table 5 are respectively added to separate mediums in amounts corresponding to 3 g/l. Culturing is carried out for 3 days. The results are shown in Table 5.

TABLE 5

| Purine analogue | Amount of riboside accumulated (g/l) |
| --- | --- |
| 8-azaguanine | 4.9 |
| 6-mercaptoguanine | 4.2 |
| 6-mercaptopurine | 4.7 |
| 6-hydroxyaminopurine | 4.2 |
| 6-methylpurine | 4.2 |

EXAMPLE 12

In this example, culturing is carried out in the same manner as in Example 1, using *Brevibacterium ammoniagenes* (ATCC 21477) as a seed microorganism. However, in this example the pyrimidine analogues as shown in Table 6 are respectively added to separate mediums in amounts corresponding to 2 g/l after 24 hours from the start of culturing. The amounts of ribosides of the respective pyrimidine analogues accumulated in the respective media are given in Table 6.

TABLE 6

| Pyrimidine analogue | Amount of riboside accumulated (g/l) |
| --- | --- |
| 5-methylcytosine | 4.1 |
| 5-fluorouracil | 2.1 |
| 5-hydroxyuracil | 3.3 |
| 2-thiouracil | 2.9 |
| 4-thiouracil | 3.6 |
| 5-chlorouracil | 2.5 |
| 5-bromouracil | 1.7 |

EXAMPLE 13

In this example, culturing is carried out in the same manner as in Example 8, except that Corynebacterium sp. No. 3546 (FERM-P No. 812) (ATCC 21648) is used as the seed microorganism. 24 hours after the start of culturing, the pyrimidine analogues as shown in Table 7 are respectively added to separate mediums in amounts corresponding to 3 g/l. Culturing is carried out fo 3 days. The amounts of the ribosides of the pyrimidine analogues respectively are shown in Table 7.

TABLE 7

| Pyrimidine analogue | Amount of riboside accumulated (g/l) |
| --- | --- |
| 5-chlorocytosine | 4.3 |
| 5-hydroxycytosine | 2.8 |

EXAMPLE 14

In this Example, culturing is carried out in the same manner as in Example 1, using *Micrococcus sodonensis* (ATCC 19212) as a seed microorganism, except that a medium containing 5 percent n-paraffin ($C_{11}$ to $C_{14}$) in place of glucose as shown in Example 1 is used as the fermentation medium. 24 hours after the start of culturing, the pyrimidine analogues as shown in Table 8 are respectively added to separate mediums in amounts corresponding to 4 g/l. Culturing is carried out for 3 days. The results are shown in Table 8.

TABLE 8

| Pyrimidine analogue | Amount of riboside accumulated (g/l) |
| --- | --- |
| 2-thiocytosine | 5.3 |
| 2-thiothymine | 4.7 |

What is claimed is:

1. A process for producing improved yields of the riboside of a heterocyclic organic base which consists of culturing a microorganism selected from the group consisting of Brevibacterium ammoniagenes (ATCC 21477), Arthrobacter sp. No. 3489 (ATCC 21647), Corynebacterium sp. No. 3546 (ATCC 21648) and *Micrococcus sodonensis* (ATCC 19212) in a nutrient medium consisting essentially of water, carbon sources, nitrogen sources, inorganic salts, required nutrients and a heterocyclic base selected from the group consisting of purine analogues and pyrimidine analogues; accumulating the riboside in the culture liquor and isolating said riboside therefrom.

2. A process according to claim 1 wherein said heterocyclic organic base is a purine analogue characterized by the general formula:

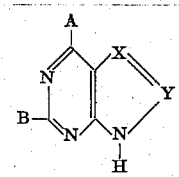

wherein A and B represent a member of the group consisting of a hydrogen atom; a hydroxyl, amino, alkylamino, dialkylamino, benzylamino, hydroxyamino, mercapto or alkylmercapto group; a halogen atom; or an alkyl, alkoxy, amide or benzyl group; and X and Y represent a member of the group consisting of a nitrogen atom or a methine group.

3. A process according to claim 1 wherein said heterocyclic organic base is a pyrimidine analogue characterized by the general formula:

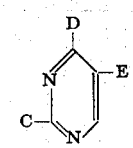

wherein C and D represent a member of the group consisting of a hydroxyl, mercapto, alkyl, amino group and a halogen atom; and E represents a member of the group consisting of a hydrogen atom; a hydroxyl, amino, or alkyl group, a halogen atom; and a trihalomethyl group.

4. A process according to claim 1 wherein said base is in the form of a salt thereof.

5. A process according to claim 1, wherein said base is present in said medium in a concentration of from 1 g/l to 20 g/l.

6. A process according to claim 1 wherein said carbon source is at least one hydrocarbon.

7. A process according to claim 1 wherein said pyrimidine analog is 6-azauracil.

* * * * *